United States Patent

[11] 3,588,906

[72] Inventors Russell H. Van Brimer; Fred E. Culp, Chillicothe, Ohio

[21] Appl. No. 768,763

[22] Filed Oct. 18, 1968

[45] Patented June 28, 1971

[73] Assignee The Mead Corporation Dayton, Ohio

[54] IMAGE CONSTRUCTION SYSTEM WITH CLOCKED INFORMATION INPUT

7 Claims, 3 Drawing Figs.

[52] U.S. Cl. .......... 346/1, 346/75, 178/6.6

[51] Int. Cl. .......... G01d 15/18, G06k 1/12

[50] Field of Search .......... 346/75; 178/6.6

[56] References Cited

UNITED STATES PATENTS

| | | | |
|---|---|---|---|
| 3,389,403 | 6/1968 | Cottingham et al. | 346/108 |
| 3,409,904 | 11/1968 | Maiershofer | 346/101 |
| 3,438,057 | 4/1969 | Neitzel | 346/107 |
| 3,293,657 | 12/1966 | Silverman | 346/110 |
| 3,298,030 | 1/1967 | Lewis et al. | 346/75 |
| 3,404,221 | 10/1968 | Loughren | 178/5.2 |

*Primary Examiner*—Joseph W. Hartary

*Attorney*—Marechal, Biebel, French & Bugg

ABSTRACT: A drop generator projects liquid drops onto a record sheet which is circulated past the generator. The generator is scanned across the sheet. Selected drops are deflected away from or deposited on the sheet according to digital control information. The gating of deflection signals is synchronized with movement of the record sheet by control signals from a fiducial tape driven from the same mechanism that moves the record sheet.

PATENTED JUN 28 1971 3,588,906

SHEET 1 OF 2

INVENTORS

RUSSELL H. VAN BRIMER &
FRED E. CULP

BY

Marechal, Biebel, French & Bugg
ATTORNEYS

IMAGE CONSTRUCTION SYSTEM WITH CLOCKED INFORMATION INPUT

CROSS REFERENCES TO RELATED APPLICATIONS

This application is related to copending applications entitled IMAGE CONSTRUCTION SYSTEM USING MULTIPLE ARRAYS OF DROP GENERATORS, Ser. No. 768,790, IMAGE CONSTRUCTION SYSTEM WITH SCANNING DROP GENERATORS, Ser. No. 768,800, HIGH SPEED PRECISION PLACEMENT OF LIQUID DROPS, Ser. No. 768,767, and IMAGE RECONSTRUCTION SYSTEM, Ser. No. 803,910 filed Mar. 3, 1969, all filed of even date herewith and all assigned to the same assignee.

BACKGROUND OF THE INVENTION

This invention relates to the field of facsimile recording wherein an image is reproduced from information contained in a physically remote master. Such a master may in general be considered as a storage medium for a three-dimensional function; that is for amplitude or reflectivity information which varies according to position within a two-dimensional grid. Therefore, facsimile reproduction of this information requires transmission, reception, and recording of a three-dimensional electrical signal. Recorders which are provided for this purpose must be adapted to generate a two-dimensional grid corresponding to that of the master and to create at each location within the grid a visible impression of the amplitude or reflectivity information associated with that location.

In the prior art it has been common practice to provide facsimile recorders comprising a writing means, receiving member support means, and motive means for producing two dimensional relative movement between the writing means and the receiving member support means. In general the motive means has been driven in response to some established standard, thereby reducing transmission signal requirements to a primary carrier modulating signal and intermittent movement synchronizing signals.

In fully electric systems such as television where the motive means consists simply of magnetic coils, the resolution of the resulting image is limited only by the bandwidth of the transmitted signal. However, for recorders employing moving parts, inertia-associated errors have degraded system resolution. Furthermore, errors in positional placement of visible marks tend to increase with increasing speed of the moving parts. As a result thereof, prior art facsimile recorders have been restricted to relatively slow speed operation and have difficulty in reproducing an image with true graphic arts quality.

The above-mentioned deficiencies of prior art facsimile systems are particularly noticeable in the case of recorders which employ a jet drop generator for writing means. Such a recorder necessarily must operate with high speed relative movement between the drop generator and the receiving member. Any attempt to improve resolution by slowing down recorder movement causes piling up of droplets and a consequent liquid mess on the receiving member.

SUMMARY OF THE INVENTION

In order to overcome the inadequacy of prior art facsimile systems, this invention departs from the concept of buying resolution improvement with increased precision in recorder speed control. As an alternative, the motive means are driven, within convenient tolerance limits, at some preestablished standard speed. The actual position of the writing means relative to the receiving member is continuously indicated by any convenient fiducial means. The recorder is provided with means for positionally correlated storage of received primary intelligence and further means for retrieving and recording that intelligence in response to positional data derived from the fiducial means. Positionally correlated storage is accomplished in response to grid or matrix information which is received along with the primary intelligence as part of a composite signal.

For the special case where the primary intelligence is transmitted and used in digital format, it is most convenient to break the intelligence into blocks and to send the necessary matrix information as synchronizing pulses or digital code words preceding each block. Furthermore, in most common applications wherein the primary intelligence is derived by scanning a master at high speed in a first coordinate direction while simultaneously scanning at a much slower speed in a second coordinate direction, it is usually satisfactory to synchronize or maintain positional lock only in the first or high speed coordinate direction.

As applied in the case of a jet drop recorder, the present invention employs a magnetic tape driven together with the receiving member support means and a read head arranged to generate marking pulses in response to a repeating magnetic signals impressed at accurately controlled intervals along the tape. The receiving member support means is preferably a rotatable drum upon which the receiving member or record sheet and the magnetic tape are both mounted. A drop generating unit is mounted for translational movement parallel to the axis of the rotatable drum whereby a stream of spaced drops is caused to deposit in a helical pattern about the drum. As intercepted by the record sheet the helical pattern appears as a set of closely spaced vertical lines.

While the record sheet passes under the drop generating unit, the magnetic tape simultaneously makes repeated passes under the read head, thereby causing the marking pulses to be generated in precise synchronism with the actual movement of the record sheet. The marking pulses thus generated are used to gate the primary intelligence in binary form out of an appropriate storage unit. This latter binary output is then applied to an electrostatic charging and deflecting system which selectively enables drop deposition on the record sheet for visible recording of the primary intelligence. It can be seen that since drop switching is synchronized with actual movement of the record sheet, drop deposition occurs at the proper matrix location.

To improve the precision of the system, the drop generator is preferably excited in synchronism with the above-mentioned marking pulses, thereby causing exact one-for-one correspondence between drops and drop switching signals. Such a control technique furthermore can insure that each drop is stimulated precisely in phase with the marking signals thereby causing each nondeflected drop to deposit upon the record sheet exactly in the center of its assigned matrix cell. Using drops which create a generally circular mark or deposit on the sheet in the order of 0.005 inch to 0.010 inch, it is possible to obtain image resolution in excess of 100 lines per inch with this system.

The primary object of the invention, therefore, is to provide an improved high resolution system for the construction of images and the like, wherein the information signals controlling recording mark placement are gated according to the position of the receiving member, thus improving the precision with which the marks are placed on a coordinate basis.

Other objects and advantages of the invention will be apparent from the following description, the accompanying drawings and the appended claims.

DESCRIPTION OF THE PREFERRED EMBODIMENT

Figure 2:
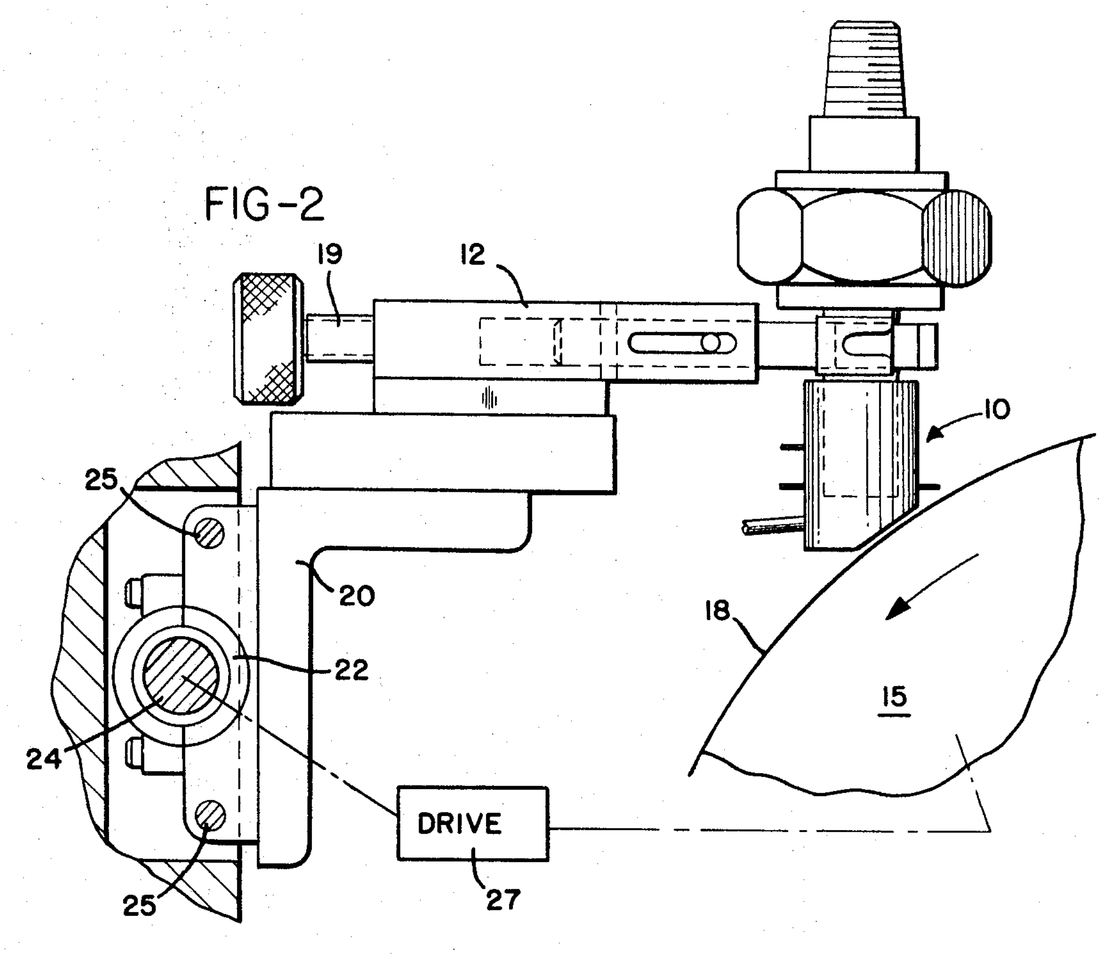
FIG. 2 is a detail view showing the mounting and scanning drive for the drop generator.

A preferred embodiment of the invention employs a drop generator 10 adjustably supported on an arm 12 (FIG. 2), and positioned over the surface of a rotating cylinder 15 carrying a receiving member 18, such as a paper sheet, on its surface. The supporting arm 12 may include a threaded adjustable shaft 19 for precise positioning of the drop generator in close proximity to the surface of the receiving member.

This structure is in turn mounted upon a slide 20 which is moved through connections between a nut 22 carried on the slide and a helically threaded cross-shaft 24. The slide may be supported and guided on suitable rods 25 extending parallel to the threaded shaft 24.

Figure 3:
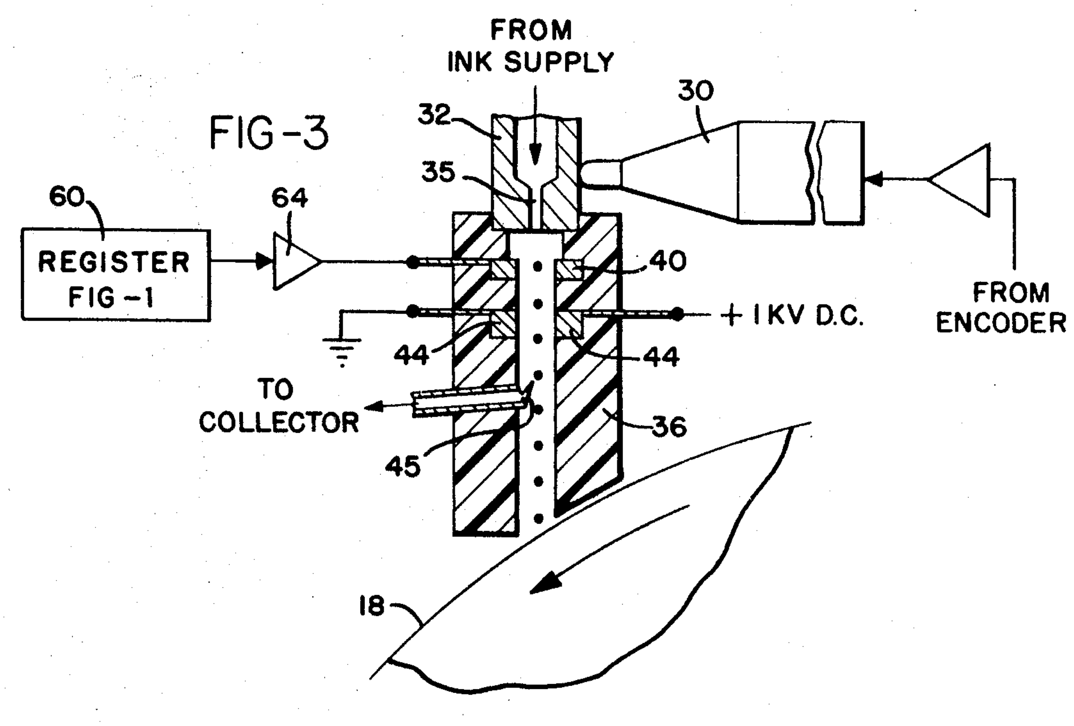
FIG. 3 is a detail view showing internal construction of the drop generator and indicating the connection of parts thereof with other units of the system.

The drive means 27 is connected to rotate cylinder 15 at a predetermined speed and to rotate the shaft 24 at a predetermined substantially slower speed. Rotation of the drum 15 is related to the frequency of drop generation, which is controlled by a vibrating stimulator 30 (FIG. 3). The correlation between movement of the receiving member 18 and drop generation rate is such that the dots formed on the receiving member by successive drops will preferably adjoin or overlap, although they may be in slightly spaced relation if so desired. The rotation of shaft 24 is such that during one complete revolution of the cylinder movement of the drop generator longitudinally of the cylinder will occur through a distance equal to the desired center-to-center dot separation distance. In other words, the drop generator is caused to scan in a shallow helical path over the surface of the cylinder 15 and the receiving member 18 carried thereon.

Preferably the longitudinal centerline of the drop generation intersects the arcuate path of the receiving member 18 at an angle such that the velocity component of the drops along this arcuate path approximately equals the velocity of the receiving member. This angular intersection can be achieved by aligning the longitudinal axis of the drop generator with a chord of the circular cross section of the cylinder 15, the particular chord being chosen to achieve the desired angular relationship.

Details of the drop generator are shown in FIG. 3, and include an ink supply tube 32 having a discharge orifice 35 aligned to direct drops of liquid ink along a path or trajectory which extends through a housing 36 toward the receiving member. Ink under pressure is supplied to tube 32 from a suitable source (not shown) and the jet of liquid ink issuing from the orifice breaks into a series of drops. The nose of the stimulator 30 engages tube 32, and the resulting vibration, in the order of 40 kHz., causes drops of essentially equal size to be formed at precisely spaced intervals.

Control over the individual drops is exercised through an electrostatic charging and deflecting system. A charge ring 40 surrounds the path of the jet immediately below the orifice 35, at or near the point where drops break away from the stream of liquid emerging from the orifice. By selectively imposing a potential difference between the ring 40 and tube 32, a charge status can be imparted to selected drops. Below the charge ring is a set of electrodes 44, across which a substantial potential difference (e.g. in the order of 1 kv.) is applied to create a deflection field.

Uncharged drops continue along the normal trajectory and impact on the receiving member, while charged drops are switched by the field into a catcher 45 and thus removed from the system. By correlating drop switching with the movement of the receiving member, it is thus possible to locate each drop deposited on the member 18 according to a coordinate position in a matrix. Precise placement of many small drops thus permits the construction of high quality images on the receiving member.

Figure 1:
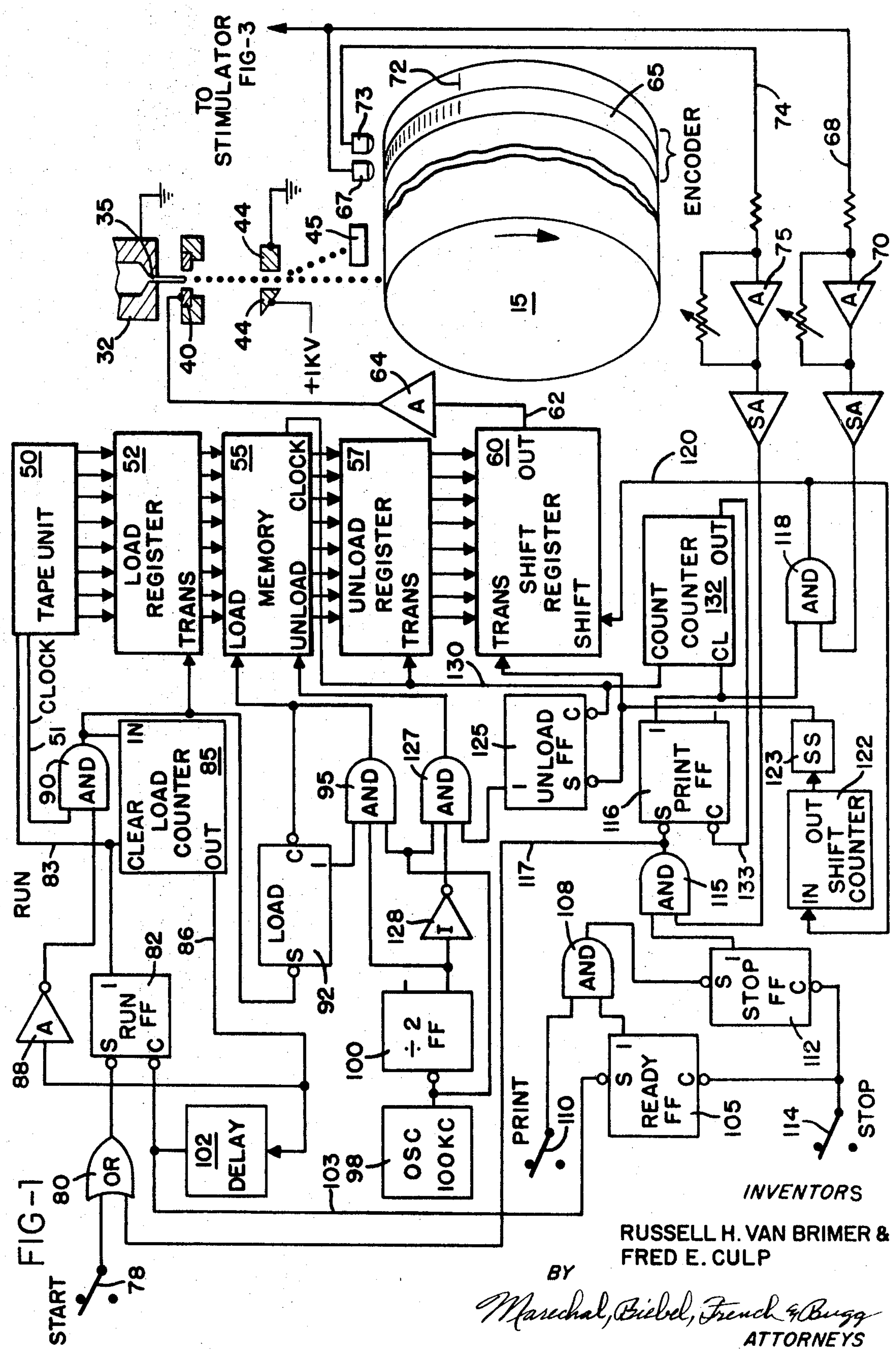
FIG. 1 is a combined block and logic diagram, including a schematic illustration of a drop generator and related construction, illustrating a system in accordance with the invention.

Referring to FIG. 1, the positionally correlated information may be recorded in a typical memory unit, shown for purposes of example as a magnetic tape recording unit 50. The type of unit illustrated employs eight channels and is thus capable of supplying information in bytes of eight bits or digits. The tape unit includes an internal clock which controls the output of information and provides a clock signal on line 51, and suitable controls are also incorporated in the unit for starting, stopping and advancing, all of these controls being conventional and well known in the art. The tape unit 50 is connected to unload information, a byte at a time, into a first or loading register 52, which in turn is connected to load information one byte at a time into a suitable memory 55, such as a typical core matrix memory. In one embodiment of the invention the memory 55 is divided into two units, each capable of storing 1,024 8-bit bytes of information. The memory output is connected to an unloading register 57 which handles output information from the memory one byte at a time and is connected to pass this information on in the same fashion to an output shift register 60. This shift register has a serial output line 62 connected through an amplifier 64 (and other suitable pulse shaping circuits which are not shown for purposes of simplification) to the charging ring 40 of the drop generating unit. The information unloaded into the shift register 60 thus is received as full bytes of information, and is transmitted through line 62 as individual bits in the proper sequence.

The registers and the memory thus serve as a buffer capable of receiving and storing the information, and passing it on to the drop generating unit where it is used as switching commands for permitting or inhibiting drop deposition at each location upon the surface of the receiving member 18 carried on the rotating drum 15. For purposes of this invention, the surface of the receiving member can be considered to be divided in matrix fashion, with the individual helical scan lines followed by the drop generator 10 defining one set of parallel matrix coordinate lines and the coordinate locations for the lines perpendicular thereto being indicated by fiducial means driven in common with the cylinder 15. Typical fiducial means are shown as a strip of magnetic recording material, such as tape 65 which has pulse generating marks recorded thereon in regular intervals. A series of pulses are generated in response to these marks by a magnetic pickup head 67 and these are transmitted as "mark" control pulses over line 68 to an input amplifier 70. For control purposes the fiducial means also carry in a separate track a single pulse generating mark 72 which creates a pulse once each revolution in the pickup head 73, and this pulse is transmitted as a synchronizing pulse over line 74 to amplifier 75, and thence into the system.

To initiate operation of the buffer, closing of the manual start switch 78 will produce an output from OR gate 80 to set the running control flip-flop 82, thus producing a set output from this flip-flop which is connected to signal the tape unit 50 over line 83, and hence initiate reading of information from the tape reading unit. The output from flip-flop 82 also provides an input to a load control counter 85 to clear that counter and prepare it for a loading operation. With the counter cleared, its output line 86 is at a low logic level, and this results in a high level logic signal from the inverting amplifier 88 to the load control AND gate 90. This enables the AND gate 90, and clock pulses over line 51 from the tape unit 50 are transmitted by AND gate 90 to the counter 85, and are subsequently accumulated in this counter as they occur, until the counter fills. The control 85 has a capacity of one-half of the memory 55. The output from AND gate 90 also is transmitted to the load register 52 as a transfer input signal, and further is connected to the set input of the memory load control flip-flop 92.

A load control AND gate 95 receives an enabling signal each time the load flip-flop 92 is set, and this AND gate has two additional inputs, one coming directly from the output of a 100 kc. oscillator 98, and the other coming from the output of a dividing flip-flop 100. Therefore, the AND gate 95 is enabled on every other output from the oscillator 98, provided the load flip-flop 92 is set. An output from AND gate 95 produces a load signal to the memory 55, and also produces a reset or clear signal to the load flip-flop 92, thus immediately inhibiting AND gate 95. This circuit therefore permits the loading, one byte at a time, of information from register 52 into memory 55. So long as the run control flip-flop 82 remains in its set condition, this sequence repeats and the tape unit unloads the position control information into the register 52, from whence the information is transferred into the memory 55.

When the load control 85 is full, a high level output on line 86 results in a low level output from the inverter 88, inhibiting the AND gate 90 and terminating the transfer pulses to register 52. Further, line 86 is connected through a delay circuit 102 to the clear or reset input of flip-flop 82, thus removing the run signal from line 83 and stopping the tape unit. The output from the delay circuit also is transmitted over line 103 to the set input of a further control flip-flop 105 which indicates that the buffer is ready for a printing operation.

The set output flip-flop 105 enables an AND gate 108, and the other input to this AND gate is from a manually operated switch control 110. To initiate the first printing operation this switch is closed, thus enabling AND gate 108 which in turn provides a set signal to the stop control flip-flop 112. If at any time it is desired to stop the printing operation, the manually operated stop switch 114 can be operated to provide clear or reset signals to flip-flops 105 and 112. The set output of flip-flop 112 provides an enabling circuit to a print control AND gate 115. The second input to this AND gate is through amplifier 75 from the synchronizing pulse generating circuit of the encoder. When this signal is received the resulting output from AND gate 115 provides a set input to the print control flip-flop 116, and also provides a signal over line 117 to the OR gate 80, to again set the run control flip-flop 82, since it is now possible to commence a loading operation from the tape unit, with the printer beginning to use information from the memory 55.

It should be understood that on starting a further loading operation may begin after the load control 85 has terminated loading of the first 1,024 bytes and the printing cycle has begun. This is due to the fact that the memory actually has twice this capacity. One-half can be fully loaded at the start, then unloading will proceed from that half of the memory while loading can similarly occur in the other half of the memory with the information being transferred internally from input to output of the memory. With the print flip-flop set, its output provides an enabling signal to the mark control AND gate 118. The other input to this AND gate is from amplifier 70 and the mark pulse generating system of the fiducial means. The mark pulses are thus passed on through the output of AND gate 118, via line 120, to the shift input of the shift register 60. Assuming for the moment that a byte has been transferred into this shift register, the mark pulses will cause the individual bits to be transmitted as control pulses on the output line 62, and this will result in charging, or not charging, of the individual drops depending upon the status of the individual bits or digital signals.

Line 120 also is connected to the input of a shift control counter 122 which has a capacity of eight bits, in other words the information in one byte. Once this counter fills it sends an output to a single shot multivibrator circuit 123, which in turn transmits a signal to the set input of an unload control flip-flop 125, and also transmits a transfer pulse to the shift register 60, enabling it to receive the next byte from the unload register 57. The set output of flip-flop 125 is connected to one of the three inputs of the unload control AND gate 127. The other inputs to this AND gate come from the oscillator 98 and from the dividing flip-flop 100 through an inverter 128. Because of the inverter circuit, the pulses on which AND gate 127 is enabled are the opposite pulses from those on which AND gate 95 is enabled. In this manner the loading and unloading of the memory is interlaced, each occurring in this example at a maximum rate of 50 kilocycles.

There is an unload clock signal from memory 55, transmitted on line 130, which goes to the transfer input of the unload register 57, to the reset or clear input of the unload control flip-flop 125, and as a count to the unload counter 132. This counter is cleared each time there is a set output from the print flip-flop 116, which also enables the AND gate 118. Unloading from the memory into register 57 will continue as the register is available to receive additional bytes of information, and each transfer of one byte will add another count into the unload counter 132, which has a capacity of 1,024. When this counter fills, it produces an output on line 133 to the clear or reset input of print control flip-flop 116, resulting in an inhibiting signal to the AND gate 118 and thereby preventing further shift pulses to the shift register until the next synchronizing signal over line 74 which will again cause AND gate 115 to set the print flip-flop 116 and begin operation on the next scan over the receiving member.

This assures that each printing operation begins in a new scan at the same location, and assures proper alignment of successive "strings" of dots produced by successive scans of the receiving member past the drop projector. It will be appreciated that the feedback arrangement from the fiducial means, which in turn controls the unload register and shift register, provides a control which unloads the buffer in exact positional correlation to the intended coordinate location of the marks or dots to be placed on the receiving member. Each mark pulse over line 68 functions to gate a corresponding bit of information from the shift register, and depending upon the nature of this bit, the corresponding drop will pass to the receiving member, or will be deflected and removed from the drop trajectory thereby not placing a mark within the designated matrix cell on the receiving member. Centering of the aforesaid mark within its assigned matrix cell is accomplished by driving stimulator 30 in synchronism with the mark pulses. Using drops of the size previously mentioned, it is possible to construct images in full or half tone with great precision, and to reconstruct such images repeatedly as may be desired.

Although the preferred embodiments as above described employs a tape unit for input to the recorder, it is obvious that load register 52 could be modified for serial rather than parallel input and driven directly by a facsimile receiver. The recorder of the present invention is thus adaptable for real time facsimile recording. Also, the rotating drum 15 could be replaced by a revolving circular disc.

According to the concepts disclosed herein, it is possible to control drop deposition horizontally as well as vertically by simply driving a second fiducial means in common with the translating drop generator, as from the lead screw 24, and using the resulting second set of marking signals as an additional criterion for unloading of the output shift register. This arrangement of course requires that the translational driving speed of the drop generator be adjusted in such a manner as to insure that the double gating criteria is satisfied at least once for each cell in the receiving member matrix. In this case, suitable logic networks would be employed to prevent deposition more than once in the same cell.

While forms of the apparatus herein described constitute preferred embodiments of the invention, it is to be understood that the invention is not limited to these precise forms of apparatus, and that changes may be made therein without departing from the scope of the invention.

We claim:

1. The method of placing of liquid drops to form an image comprising the steps of:

storing digital intelligence signals corresponding to the incremental information content of elemental areas of an image in correlated fashion providing a storage pattern corresponding to the positional correlation of the image element;

moving a receiving member past a drop generator in a pattern corresponding to said storage pattern;

while moving the receiving member relative to the drop generator generating from such relative movement a time varying marking signal representing pattern positions actually reached during said movement;

stimulating the drop generator from said marking signals to correlate the drop generation rate with the actual relative movement between the receiving member and the drop generator;

reading out the stored intelligence signal under control of the time varying marking signal thereby creating a time varying drop control signal correlated to the position of the drop generator relative to the receiving member; and applying the drop control signal to the drop generator thereby creating on the receiving member an accurately registered image comprised of dots resulting from drops deposited on the receiving member.

2. Apparatus for precise placement of liquid drops on a receiving member to form an image according to a source of positionally correlated digital information, comprising:

a drop generator capable of projecting individual liquid drops along a path at predetermined spacing and including charging means for selectively charging and deflecting individual drops;

means for driving a receiving member past said path at a predetermined constant speed;

means monitoring the movement of the receiving member and generating marking signals correlated to the instantaneous relative position of the drop path and the receiving member;

stimulating means incorporated in said drop generator and responsive to said marking signals to create drops of essentially equal size and spacing;

an information source providing digital signals defining a pattern to be formed on the receiving member by placement of the individual drops;

an output connection from said information source to said drop generator charging means for controlling the deposition of individual drops onto the receiving member;

gating means responsive to said marking signals and connected to control the transmission of signals over said output connection;

and a control connection from said monitoring means to said gating means providing for transmission of control signals to said drop generator charging means in synchronism with movement of the receiving member.

3. Apparatus for the precise placement of liquid drops on a receiving surface image; form an image, comprising:

a source of positionally correlated information defining the location of dots making up the image;

means for generating and projecting a stream of separate uniformly sized drops of liquid along a predetermined trajectory;

stimulating means operating on said drop generating means to cause uniform predetermined spacing between successive drops;

charging means located along the drop path and constructed and arranged to apply an electrostatic charge selectively to an individual drop;

means providing a constant deflection field along the drop path downstream of said charging means, means for preventing the deflected drops from depositing on the receiving surface;

means supporting a receiving surface intersecting said trajectory;

drive means producing relative movement between said drop generating means and said supporting means at a constant rate;

pulse generator means controlled by said drive means and generating marking signals connected to control the frequency of said stimulating means;

a buffer receiving and storing said positionally correlated information from said source;

said buffer having a control connection responsive to said marking signals for selectively unloading information in a positional correlation corresponding to the positional correlation of the marking signals; and an output connection from said buffer to said charging means for producing an image on said receiving member having correct register in the direction of said relative movement.

4. Apparatus for precise placement of liquid drops on a receiving member, comprising:

drop generator means capable of projecting individual liquid drops along a path at predetermined spacing;

said drop generator means including an orifice receiving a flow of liquid under pressure;

means for stimulating the flow through said orifice at a predetermined frequency to create a stream of regularly spaced drops;

means for selectively charging and deflecting individual ones of the drops to allow only selected drops to pass along said path;

means for driving a receiving member past said path at a predetermined constant speed;

a pulse generator driven from said driving means;

said stimulating means being controlled by said pulse generator to synchronize the generation of drops with the movement of the receiving member;

an information source providing signals defining a pattern to be formed on the receiving member by placement of the individual drops;

gating means controlling the output of signals from said information source;

an output connection from said gating means to said charging and deflecting means for controlling the timing of deposition of drops onto the receiving member;

and a control connection from said pulse generator to said gating means providing for transmission of control signals to said drop generator means in synchronism with movement of the receiving member.

5. Apparatus as defined in claim 4, wherein said charging and deflecting means includes a charging electrode spaced from said orifice and connected to said output connection from said gating means to place an electrostatic charge on selected ones of the drops;

deflecting electrode means downstream along said path from said charging electrode and adapted to create a deflection field for charged drops;

and means for intercepting those drops deviating from said path whereby only predetermined ones of the generated drops are deposited on the receiving member.

6. Apparatus as defined in claim 4 wherein said driving means is a rotating cylinder having means for carrying a receiving member over a curvilinear path defined by at least a portion of the cylinder surface;

and supporting means for said drop generator means aligning said path of the drops to intersect said curvilinear path.

7. Apparatus as defined in claim 4, wherein said information source includes a register for storing digital signals representing the placement locations for drops on the receiving member;

said register having an information output including said gating means;

and said control connection including means to unload said register in series sequence.